United States Patent
Nam et al.

(10) Patent No.: US 7,826,615 B2
(45) Date of Patent: Nov. 2, 2010

(54) SCRAMBLING APPARATUS AND METHOD USING CONVERSION OF MOTION VECTOR INFORMATION OF VIDEO DATA

(75) Inventors: Su-hyun Nam, Seoul (KR); Myung-sun Kim, Uiwang-si (KR); Yong-jin Jang, Uiwang-si (KR); Sun-nam Lee, Suwon-si (KR); Jae-heung Lee, Suwon-si (KR); Sang-su Choi, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1003 days.

(21) Appl. No.: 11/049,734

(22) Filed: Feb. 4, 2005

(65) Prior Publication Data

US 2005/0169380 A1 Aug. 4, 2005

(30) Foreign Application Priority Data

Feb. 4, 2004 (KR) .................. 10-2004-0007212

(51) Int. Cl.
*H04N 7/167* (2006.01)
(52) U.S. Cl. ....................... 380/210; 726/36
(58) Field of Classification Search ................ 348/402; 375/240; 380/205, 210, 216, 217; 382/268; 726/36
See application file for complete search history.

(56) References Cited

U.S. PATENT DOCUMENTS 5,377,266 A * 12/1994 Katta et al. ................. 380/217
5,636,279 A * 6/1997 Katta et al. ................. 380/217
6,215,823 B1 * 4/2001 Kim et al. ............... 375/240.16
6,271,885 B2 * 8/2001 Sugiyama ................ 348/402.1
6,459,794 B1 * 10/2002 de Vito et al. ............... 380/210

(Continued)

FOREIGN PATENT DOCUMENTS

CN 1759373 A 12/2006

(Continued)

OTHER PUBLICATIONS

Zheng Liu, Motion Vector Encryption in Multimedia Streaming, Year 2004, The University of Queensland, Australia, MMM'04, pp. 1-8.*

(Continued)

*Primary Examiner*—Kambiz Zand
*Assistant Examiner*—Monjour Rahim
(74) *Attorney, Agent, or Firm*—Sughrue Mion, PLLC

(57) ABSTRACT

A scrambling apparatus and method are provided for increasing randomness without damaging compression efficiency of total video data by selectively and randomly performing conversion when converting motion vector codes of compressed video data into other motion vector codes indicating other motion vector values, and more particularly, by performing conditional conversion only if a predetermined condition is satisfied when selective conversion of motion vector codes is performed. The scrambling apparatus includes a conversion motion vector code table generator generating a conversion motion vector code table comprising motion vector codes obtained by converting motion vector codes corresponding to motion vector values of input video data in a standard motion vector code table; and a conversion controller randomly determining whether a certain motion vector value is encoded using the conversion motion vector code table or the standard motion vector code table.

20 Claims, 7 Drawing Sheets

U.S. PATENT DOCUMENTS

| | | |
|---|---|---|
| 6,505,299 B1 | 1/2003 | Zeng et al. |
| 7,072,470 B2 * | 7/2006 | Koto et al. .................. 380/210 |
| 7,095,448 B2 * | 8/2006 | Zhou et al. .................. 348/576 |
| 7,103,184 B2 * | 9/2006 | Jian ........................... 380/205 |
| 7,151,832 B1 * | 12/2006 | Fetkovich et al. ........... 380/210 |
| 7,221,761 B1 * | 5/2007 | Deshpande et al. ......... 380/216 |
| 7,292,690 B2 * | 11/2007 | Candelore et al. .......... 380/210 |
| 2002/0001416 A1 * | 1/2002 | Zhou et al. .................. 382/268 |
| 2002/0018565 A1 | 2/2002 | Luttrell et al. |
| 2003/0053543 A1 * | 3/2003 | Bhaumik et al. ....... 375/240.16 |
| 2003/0210785 A1 * | 11/2003 | Jian ........................... 380/210 |
| 2003/0231336 A1 | 12/2003 | Kim |
| 2004/0037422 A1 * | 2/2004 | Bodo et al. .................. 380/210 |
| 2005/0169380 A1 * | 8/2005 | Nam et al. ............. 375/240.16 |
| 2005/0254649 A1 * | 11/2005 | Demos ....................... 380/205 |
| 2007/0291940 A1 * | 12/2007 | Candelore et al. ........... 380/210 |

FOREIGN PATENT DOCUMENTS

| | | |
|---|---|---|
| JP | 8-130727 A | 5/1996 |
| JP | 2000-253375 A | 9/2000 |
| JP | 2001-145080 A | 5/2001 |
| KR | 2001-0106815 A | 12/2001 |

OTHER PUBLICATIONS

Wenjun Zeng, et al., "Efficient Frequency Domain Selective Scrambling of Digital Video", IEEE Transactions on Multimedia, vol. 5, pp. 118-129, Mar. 2003.

* cited by examiner

FIG. 2

| MVD | CODING CODE |
|---|---|
| −16&16 | 0000 0011 001 |
| −15&17 | 0000 0011 011 |
| −14&18 | 0000 0011 101 |
| −13&19 | 0000 0011 111 |
| −12&20 | 0000 0100 001 |
| −11&21 | 0000 0100 011 |
| −10&22 | 0000 0100 11 |
| −9&23 | 0000 0101 01 |
| −8&24 | 0000 0101 11 |
| −7&25 | 0000 0111 |
| −6&26 | 0000 1001 |
| −5&27 | 0000 1011 |
| −4&28 | 0000 111 |
| −3&29 | 0001 1 |
| −2&30 | 0011 |
| −1 | 011 |
| 0 | 1 |
| 1 | 010 |
| 2&−30 | 0010 |
| 3&−29 | 0001 0 |
| 4&−28 | 0000 110 |
| 5&−27 | 0000 1010 |
| 6&−26 | 0000 1000 |
| 7&−25 | 0000 0110 |
| 8&−24 | 0000 0101 10 |
| 9&−23 | 0000 0101 00 |
| 10&−22 | 0000 0100 10 |
| 11&−21 | 0000 0100 010 |
| 12&−20 | 0000 0100 000 |
| 13&−19 | 0000 0011 100 |
| 14&−18 | 0000 0011 110 |
| 15&−17 | 0000 0011 010 |

FIG. 7

| MVD | CODING CODE | MVD TO BE CONVERTED | CONVERTING OR NOT |
|---|---|---|---|
| -16&16 | 0000 0101 10 | 8&-24 | O |
| -15&17 | 0000 0100 011 | -10&22 | O |
| -14&18 | 0000 0011 101 | 5&-27 | X |
| -13&19 | 0000 0100 10 | 10&-22 | O |
| -12&20 | 0000 0101 01 | -9&23 | O |
| -11&21 | 0000 0100 010 | 11&-21 | O |
| -10&22 | 0000 0100 11 | 3&-29 | X |
| -9&23 | 0000 0110 | 7&-25 | O |
| -8&24 | 0000 0011 110 | 14&-18 | O |
| -7&25 | 0000 1000 | 6&-26 | O |
| -6&26 | 0000 1011 | -5&27 | O |
| -5&27 | 0000 1001 | -6&26 | O |
| -4&28 | 0000 110 | 4&-28 | O |
| -3&29 | 010 | 1 | O |
| -2&30 | 0010 | 2&-30 | O |
| -1 | 011 | 15&-17 | X |
| 0 | 1 | 12&-20 | X |
| 1 | 0001 1 | -3&29 | O |
| 2&-30 | 0011 | -2&30 | O |
| 3&-29 | 0001 0 | -10&22 | X |
| 4&-28 | 0000 111 | -4&28 | O |
| 5&-27 | 0000 1010 | -14&18 | X |
| 6&-26 | 0000 0111 | -7&25 | O |
| 7&-25 | 0000 0101 01 | -9&23 | O |
| 8&-24 | 0000 0011 001 | -16&16 | O |
| 9&-23 | 0000 0011 100 | 13&-19 | O |
| 10&-22 | 0000 0100 11 | -13&19 | O |
| 11&-21 | 0000 0100 011 | -11&21 | O |
| 12&-20 | 0000 0100 000 | 0 | X |
| 13&-19 | 0000 0101 00 | 9&-23 | O |
| 14&-18 | 0000 0101 11 | -8&24 | O |
| 15&-17 | 0000 0011 010 | -1 | X |

SCRAMBLING APPARATUS AND METHOD USING CONVERSION OF MOTION VECTOR INFORMATION OF VIDEO DATA

This application claims priority from Korean Patent Application No. 10-2004-0007212, filed on Feb. 4, 2004, in the Korean Intellectual Property Office, the disclosure of which is incorporated herein in its entirety by reference.

BACKGROUND OF THE INVENTION

1. Field of the Invention

The present invention relates to an apparatus and method for scrambling video data, and more particularly, to a scrambling apparatus and method using conversion of motion vector information of video data.

2. Description of the Related Art

When a cable broadcasting station broadcasts a certain program through a pay-per-view channel, video data such as movies and TV programs sometimes must be scrambled to allow only regular subscribers to watch.

For a viewer who has received scrambled video data to view the video, the viewer must have a descrambler to descramble the received video data, and if the viewer tries to view the video without descrambling the scrambled video data, the viewer cannot view the video.

Since a conventional scrambling apparatus totally scrambles video data so that nobody but regular subscribers can view the video, it is impossible for cable broadcasting stations to allow general users (not regular subscribers) to partially watch the video, so they might lose the chance to make more contracts with general users and the apparatus also causes complexity of calculation and decrease of a processing speed.

To solve these problems, for example, Japanese patent publication No. JP 6-90451 'SCRAMBLING APPARATUS' discloses a method of scrambling video data by converting motion vector codes of compression data of the video data based on an H.261 or MPEG standard into other motion vector codes indicating the same code lengths as and different values from the original motion vector codes.

However, since a conversion range between motion vector codes indicating the same code lengths as and different values from each other is narrow, a scrambling effect decreases, and furthermore, if conversion of motion vector codes is performed for every input macroblock, security becomes weak due to regularity of the conversion.

SUMMARY OF THE INVENTION

The present invention provides a scrambling apparatus and method for selectively performing random conversion when motion vector codes of compressed video data are converted into other motion vector codes indicating different motion vector values.

The present invention also provides a scrambling apparatus and method for strengthening randomness without damaging compression efficiency of total video data by performing conditional conversion only if a predetermined condition is satisfied when selective conversion of motion vector codes is performed.

According to an aspect of the present invention, there is provided a scrambling apparatus comprising: a conversion motion vector code table generator generating a conversion motion vector code table comprising motion vector codes obtained by converting motion vector codes corresponding to motion vector values of input video data in a standard motion vector code table; and a conversion controller randomly determining whether a certain motion vector value is encoded using the conversion motion vector code table or the standard motion vector code table.

If encoding using the conversion motion vector code table is determined, the conversion controller can determine that the certain motion vector value is encoded using the conversion motion vector code table only if motion vector codes before and after conversion of the certain motion vector value satisfy a predetermined condition, and more particularly, the conversion controller can determine that the certain motion vector value is encoded using the standard motion vector code table if the number of bits of the motion vector code after the conversion is a predetermined number of bits or more larger than the number of bits of the motion vector code before the conversion.

The conversion motion vector code table generator can perform the conversion only if motion vector codes before and after the conversion satisfy a predetermined condition, and more particularly, the conversion motion vector code table generator may not perform the conversion if the number of bits of the motion vector code after the conversion is a predetermined number of bits or more larger than the number of bits of the motion vector code before the conversion.

According to another aspect of the present invention, there is provided a scrambling method comprising: (a) generating a conversion motion vector code table comprising motion vector codes obtained by converting motion vector codes corresponding to motion vector values of input video data in a standard motion vector code table; and (b) randomly determining whether a certain motion vector value is encoded using the conversion motion vector code table or the standard motion vector code table.

If encoding using the conversion motion vector code table is determined in operation (b), the method can further comprise: (c) determining that the certain motion vector value is encoded using the conversion motion vector code table if motion vector codes before and after the certain motion vector value is converted satisfy a predetermined condition, and more particularly, operation (c) comprises: determining that the certain motion vector value is encoded using the standard motion vector code table if the number of bits of the motion vector code after the conversion is a predetermined number of bits or more larger than the number of bits of the motion vector code before the conversion.

Operation (a) can comprise: performing the conversion only if motion vector codes before and after the conversion satisfy a predetermined condition, and more particularly, operation (a) can comprise: not performing the conversion if the number of bits of the motion vector code after the conversion is a predetermined number of bits or more larger than the number of bits of the motion vector code before the conversion.

According to another aspect of the present invention, there is provided a scrambling apparatus comprising: a conversion table generating unit generating a conversion table comprising motion vector codes obtained by converting motion vector codes corresponding to motion vector values of input video data in a standard motion vector code table; and a converter selectively performing conversion by randomly determining whether a certain motion vector code of video data encoded using the standard motion vector code table is converted into another motion vector code with reference to the conversion table.

If the conversion referring to the conversion table is determined, the converter can perform the conversion of the certain motion vector code only if a motion vector code after the conversion of the certain motion vector code satisfies a predetermined condition, and more particularly, the converter may not perform the conversion of the certain motion vector code if the number of bits of the motion vector code after the conversion of the certain motion vector code is a predetermined number of bits or more larger than the number of bits of the motion vector code before the conversion, or the converter can perform the conversion of the certain motion vector code if the number of bits of the motion vector code after the conversion of the certain motion vector code is the same as that before the conversion.

The conversion table generator can perform the conversion only if a motion vector code after the conversion satisfies a predetermined condition, and more particularly, the conversion table generator may not perform the conversion if the number of bits of the motion vector code after the conversion is a predetermined number of bits or more larger than the number of bits of the motion vector code before the conversion.

According to another aspect of the present invention, there is provided a scrambling method comprising: (a) generating a conversion table comprising motion vector codes obtained by converting motion vector codes corresponding to motion vector values of input video data in a standard motion vector code table; and (b) selectively performing conversion by randomly determining whether a certain motion vector code of video data encoded using the standard motion vector code table is converted into another motion vector code with reference to the conversion table.

If the conversion referring to the conversion table is determined in operation (b), the method can further comprise: (c) performing the conversion of the certain motion vector code only if a motion vector code after the conversion of the certain motion vector code satisfies a predetermined condition, and more particularly, operation (c) can comprise: not performing the conversion of the certain motion vector code if the number of bits of the motion vector code after the conversion of the certain motion vector code is a predetermined number of bits or more larger than the number of bits of the motion vector code before the conversion, or operation (c) can comprise: performing the conversion of the certain motion vector code if the number of bits of the motion vector code after the conversion of the certain motion vector code is the same as that before the conversion.

Operation (a) can comprise: performing the conversion only if a motion vector code after the conversion satisfies a predetermined condition, and more particularly, operation (a) can comprise: performing the conversion if the number of bits of the motion vector code after the conversion is the same as that before the conversion.

According to another aspect of the present invention, there is provided a computer readable medium having recorded thereon a computer readable program for performing the scrambling method described above.

BRIEF DESCRIPTION OF THE DRAWINGS

The above and other features and advantages of the present invention will become more apparent by describing in detail exemplary embodiments thereof with reference to the attached drawings in which:

FIG. 2 is a standard motion vector code table;

FIG. 7 is a conversion motion vector code table generated according to an exemplary embodiment of the present invention.

DETAILED DESCRIPTION OF EXEMPLARY EMBODIMENTS OF THE INVENTION

Hereinafter, the present invention will now be described more fully with reference to the accompanying drawings, in which exemplary embodiments of the invention are shown.

Figure 1:
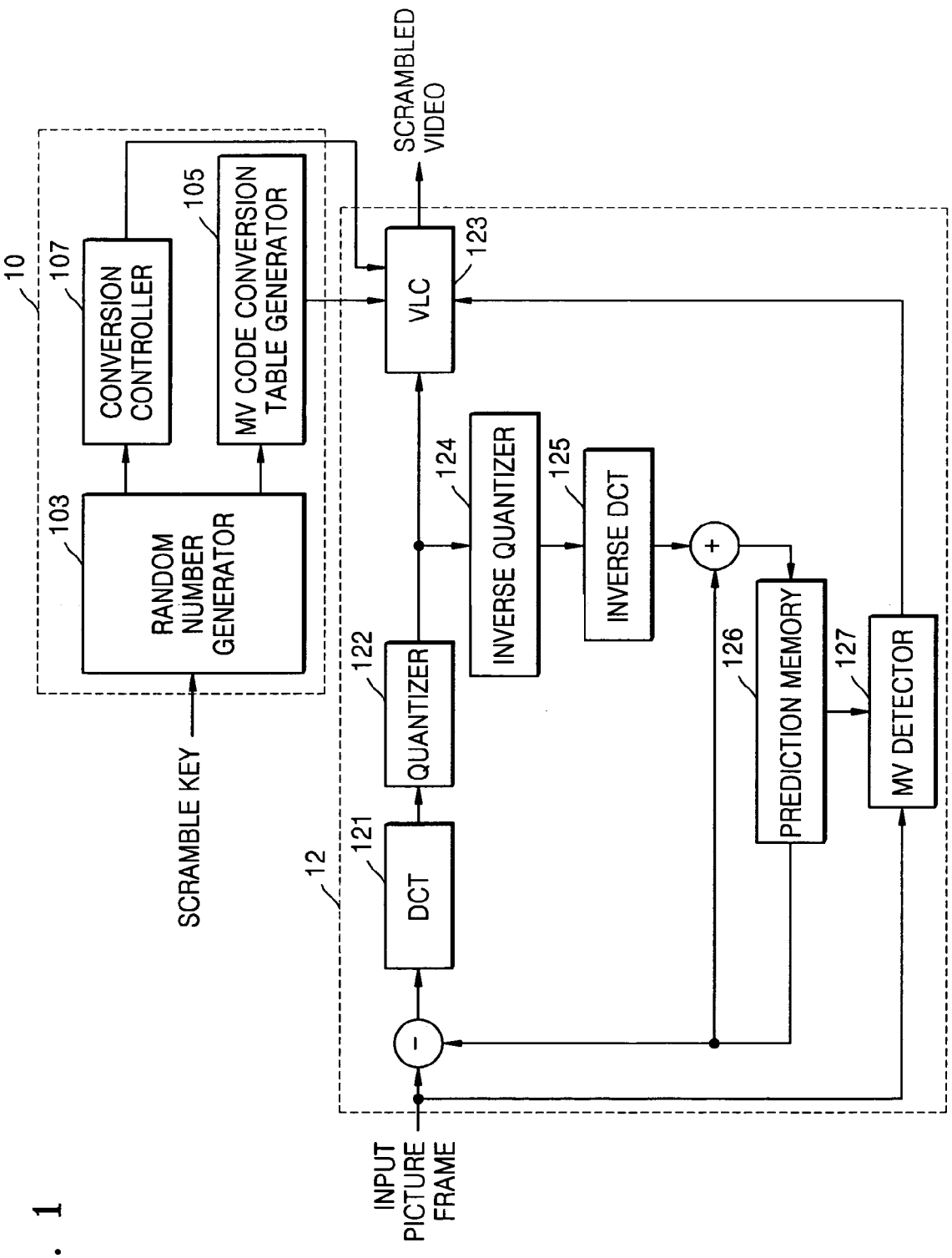
FIG. 1 is a block diagram of a scrambling apparatus according to an exemplary embodiment of the present invention.

FIG. 1 is a block diagram of a scrambling apparatus according to an exemplary embodiment of the present invention.

To provide a control signal capable of selecting a code table which an encoder 12 uses to encode a motion vector, a scrambling apparatus 10 includes a random number generator (RNG) 103 generating a random number on the basis of a predetermined random number key, a motion vector (MV) code conversion table generator 105 generating a conversion MV code table, in which MV codes are converted, from a standard MV code table according to the generated random number, and a conversion controller 107 controlling the encoder 12 so that the encoder 12 selects the standard MV code table or the conversion MV code table according to the random number generated by the RNG 103. The conversion controller 107 also controls the encoder 12 so that the encoder 12 can select the conversion MV code table when a predetermined conversion condition is satisfied.

The encoder 12, which adopts, for example, an MPEG standard, compresses and encodes input video data using an MPEG encoding method, converts an MV code of an MV value into another MV code indicating a different MV value according to the control signal from the scrambling apparatus 10, and outputs scrambled video.

According to the MPEG standard, input video is classified into three kinds such as an I picture, a P picture, and a B picture, and the I picture, which is encoded with only the current picture information, is generated without using prediction between frames, the P picture is generated by performing prediction using the I picture or another P picture, and the B picture is generated by performing prediction using preceding and/or succeeding I pictures or preceding and/or succeeding P pictures.

The I picture is input to a discrete cosine transformer (DCT) 121, processed by the DCT 121, a quantizer 122, and a variable length coder 123, and output from the variable length coder 123. The I picture output from the quantizer 122 is also stored in a prediction memory 126 after processed by an inverse quantizer 124 and an inverse DCT 125 to be used for prediction of the P picture and the B picture. When an input picture frame is a P picture, a difference between a preceding I picture or P picture stored in the prediction memory 126 and the current P picture is input to the DCT 121, processed by the DCT 121, the quantizer 122, and the variable length coder 123, and output from the variable length coder 123. To be used for prediction of a succeeding picture frame, the difference quantized by the quantizer 122 is processed by the inverse quantizer 124 and the inverse DCT 125 and added to the preceding I picture or P picture stored in the prediction memory 126, and finally the current P picture is stored in the prediction memory 126 again.

For the P picture, an MV detector 127 detects an MV of a current P picture against a preceding I picture or P picture stored in the prediction memory 126 and outputs the MV value to the variable length coder 123, and the variable length coder 123 variable-length-codes the MV value into a variable length code (VLC) according to an MV value between −16 and +16 using a variable length coding table (hereinafter, a conversion table) into which a standard variable length coding table (hereinafter, a standard table), shown in FIG. 2, used for MPEG encoding is converted by the scrambling apparatus 10 using a predetermined scramble key. Here, according to Huffman coding, the standard table shown in FIG. 2 allocates a small number of bits to the VLC for an MV value having a high occurrence frequency and a large number of bits to the VLC for an MV value having a low occurrence frequency. Accordingly, much higher compression efficiency can be obtained when the variable length coding is used rather than when constant length coding is used.

The B picture is generated by performing bi-directional prediction from a preceding and/or succeeding I picture or P picture, and the prediction memory 126 includes 2 frame memories to perform the bi-directional prediction, and the encoder 12 processes an input picture frame in a macroblock unit of 16*16 pixels, and an MV value is allocated to every macroblock.

The RNG 103 receives a scramble key which is a basis to perform scrambling and generates a random number, and the MV code conversion table generator 105 converts MV coding codes of the standard table as shown in FIG. 2 on the basis of the random number. Therefore, the variable length coder 123 encodes an MV of each macroblock on the basis of a conversion table generated by the MV code conversion table generator 105.

Also, the RNG 103 generates using a random number a conversion select control signal determining whether the variable length coder 123 encodes an MV of a macroblock on the basis of the conversion table or the standard table, and the conversion controller 107 allows the variable length coder 123 to selectively use the conversion table by controlling table selection of the variable length coder 123 according to the conversion select control signal. Therefore, since randomness is strengthened rather than when MVs of all macroblocks are encoded en bloc on the basis of only the conversion table, a scrambling effect is higher.

With reference to bit lengths of MV coding codes when the MV code conversion table generator 105 generates the conversion table, if a bit length after conversion is a predetermined amount or more longer than that before the conversion, the conversion in not performed. That is, since the bit length is allocated on the basis of probability in the variable length coding like the Hoffman coding, if an MV value to which a small number of variable length coding bits have been allocated due to a high occurrence frequency is converted into an MV value to which a larger number of variable length coding bits are allocated, the total size of data is naturally larger by probability. Therefore, conversion capable of allowing the total size of data to be too large is not performed.

Referring to the standard table of FIG. 2, if the number of bits after conversion is three bits or more larger than the number of bits before the conversion, the conversion is not performed. Therefore, if '0011' (corresponding to an MV value '−2&30') is converted into '0000 1011' (corresponding to an MV value '−5&27') as a result of a random number using a scramble key, this conversion is not performed. Further, conversion may only be performed between coding codes having the same number of bits, not between coding codes having a different number of bits. Also, according to an attribute of an MV, since the probability of an MV value of 0 is highest, conversion of a coding code '1' corresponding to the MV value of 0 is not performed.

FIG. 7 shows an example of a conversion table. The conversion table of FIG. 7 is a result of performing conversion according to a condition that the conversion is not performed if the number of bits after conversion is three bits or more larger than the number of bits before the conversion. Therefore, the conversion table of FIG. 7 shows that the conversion of '−14&18' and '5&−27', '−10&22' and '3&−29', '−1' and '15&−17', and '0' and '12&−20) is not performed.

The MV code conversion table generator 105 unconditionally generates a conversion table on the basis of a random number generated by the RNG 103 instead of generating the conversion table according to the above condition. The conversion controller 107 can control the variable length coder 123 to select the random conversion or the conditional conversion for MVs of each macroblock. That is, the conversion controller 107 controls the variable length coder 123 so that the variable length coder 123 can select a table used for coding of an MV for every macroblock according to the above condition not so that information itself of a conversion table satisfies the above condition.

In detail, the MV code conversion table generator 105 prepares coding of an MV by generating a certain conversion table on the basis of a random number generated by the RNG 103, and if an MV of a certain macroblock is input to the variable length coder 123, the conversion controller 107 controls the variable length coder 123 so that the variable length coder 123 encodes the MV of the certain macroblock using the standard table or the conversion table according to a conversion select control signal received from the RNG 103. Here, if the conversion select control signal is to use the conversion table, the conversion controller 107 determines whether an MV coding code used for coding satisfies a predetermined condition described above. If the condition is satisfied, the conversion controller 107 controls the variable length coder 123 so that the variable length coder 123 encodes the MV of the certain macroblock using the conversion table, and if the condition is not satisfied, the conversion controller 107 controls the variable length coder 123 so that the variable length coder 123 encodes the MV of the certain macroblock using the standard table.

As described above, since the variable length coder 123 randomly encodes an MV on the basis of the standard table or the conversion table according to a control signal received from the conversion controller 107 for every relevant macroblock and the conditional conversion is simultaneously applied to the variable length coder 123, when fast moving video or randomness of scrambling is considered, the conversion controller 107 may control the random conversion and the conditional conversion at the same time.

Figure 3:
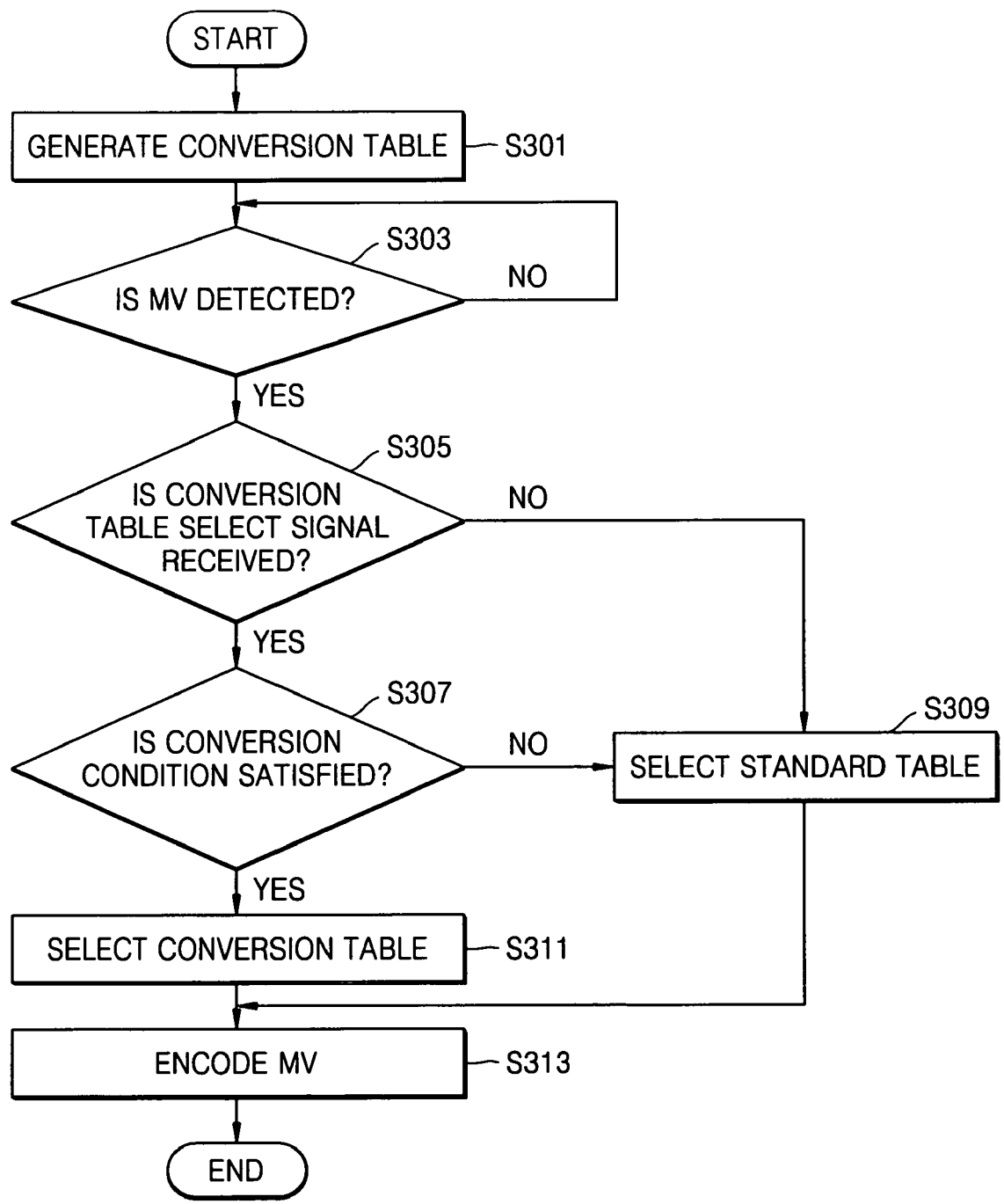
FIG. 3 is a flowchart of a scrambling method according to an exemplary embodiment of the present invention.

FIG. 3 is a flowchart of a scrambling method according to an exemplary embodiment of the present invention. Referring to FIG. 3, in operation S301, the scrambling apparatus 10 prepares to encode MVs allocated to every macroblock of an input picture frame by generating a conversion table in which MV codes corresponding to MV values are converted on the basis of a random number generated using a scramble key into MV codes corresponding to other MV values in the MV code conversion table generator 105.

It is determined whether the MV detector 127 detects an MV of a certain macroblock in operation S303. If it is not detected in operation S303, operation S303 is repeated until it is detected. If it is detected in operation S303, in operation S305, the conversion controller 107 determines whether a conversion select control signal generated by the RNG 103 indicates that a conversion table is used as an MV code table to be used for the MV of the certain macroblock. If it is determined that the conversion select control signal indicates that a conversion table is used as an MV code table to be used for the MV of the certain macroblock in operation S305, the conversion controller 107 determines whether the coding code length of the conversion table to be used for encoding the MV of the certain macroblock satisfies a conversion condition in operation S307. If the condition is satisfied in operation S307, the conversion controller 107 controls the variable length coder 123 so that the variable length coder 123 selects the conversion table to encode the MV of the certain macroblock in operation S311. If it is determined that the conversion select control signal does not indicate that a conversion table is used as an MV code table to be used for the MV of the certain macroblock in operation 305 or the coding code length of the conversion table to be used for encoding the MV of the certain macroblock does not satisfy the conversion condition in operation 307, the conversion controller 107 controls the variable length coder 123 so that the variable length coder 123 selects the standard table as shown in FIG. 2 to encode the MV of the certain macroblock in operation S309. The variable length coder 123 encodes the MV of the certain macroblock on the basis of the standard table or the conversion table in operation S313.

Figure 4:
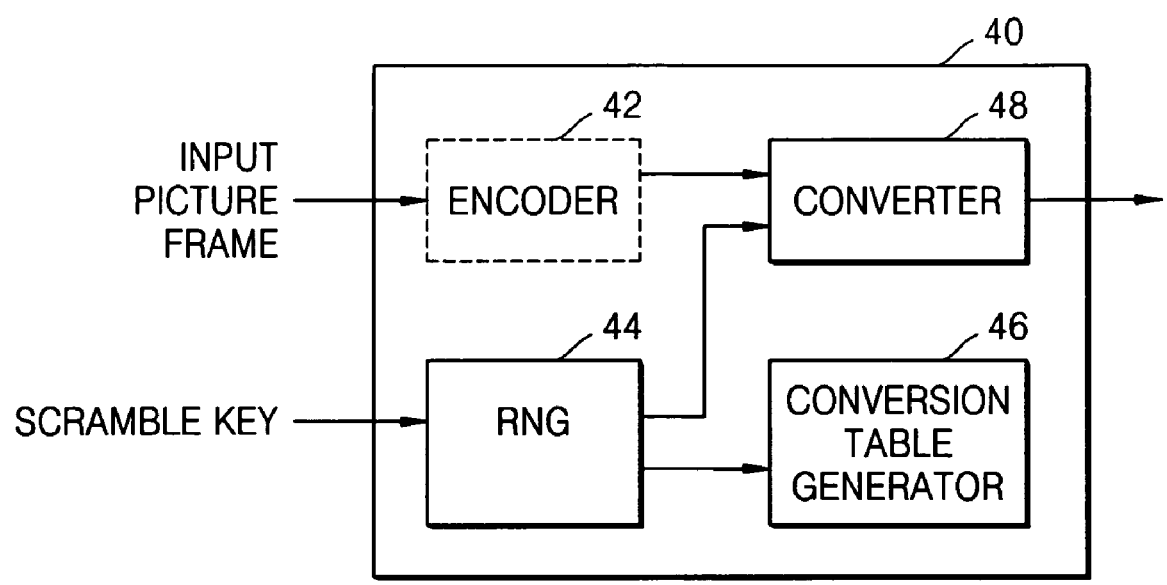
FIG. 4 is a block diagram of a scrambling apparatus according to another exemplary embodiment of the present invention.

FIG. 4 is a block diagram of a scrambling apparatus 40 according to another exemplary embodiment of the present invention. Referring to FIG. 4, the scrambling apparatus 40 includes an encoder 42 encoding an MV of an input picture using the standard table of FIG. 2; an RNG 44 generating a random number using a scramble key; a conversion table generator 46 generating a conversion table using the standard table of FIG. 2, which includes MV codes corresponding respective MV values of the input picture, on the basis of the generated random number; and a converter 48 converting an MV code of the input picture encoded by the encoder 42 using the conversion table.

Unlike the scrambling apparatus 10 of FIG. 1, the scrambling apparatus 40 converts MV codes, which are allocated to every macroblock of MVs already encoded by the encoder 42, using the conversion table. Therefore, unlike the variable length coder 123 of an MPEG standard coder of FIG. 1, which select the standard table or the conversion table, since the encoder 42 just encodes an MV of an input picture with reference to the standard table, the MPEG standard coder does not have to be reconfigured. Therefore, according to the present exemplary embodiment, the encoder 42 can be deployed as a separate component outside of the scrambling apparatus 40.

Figure 5:
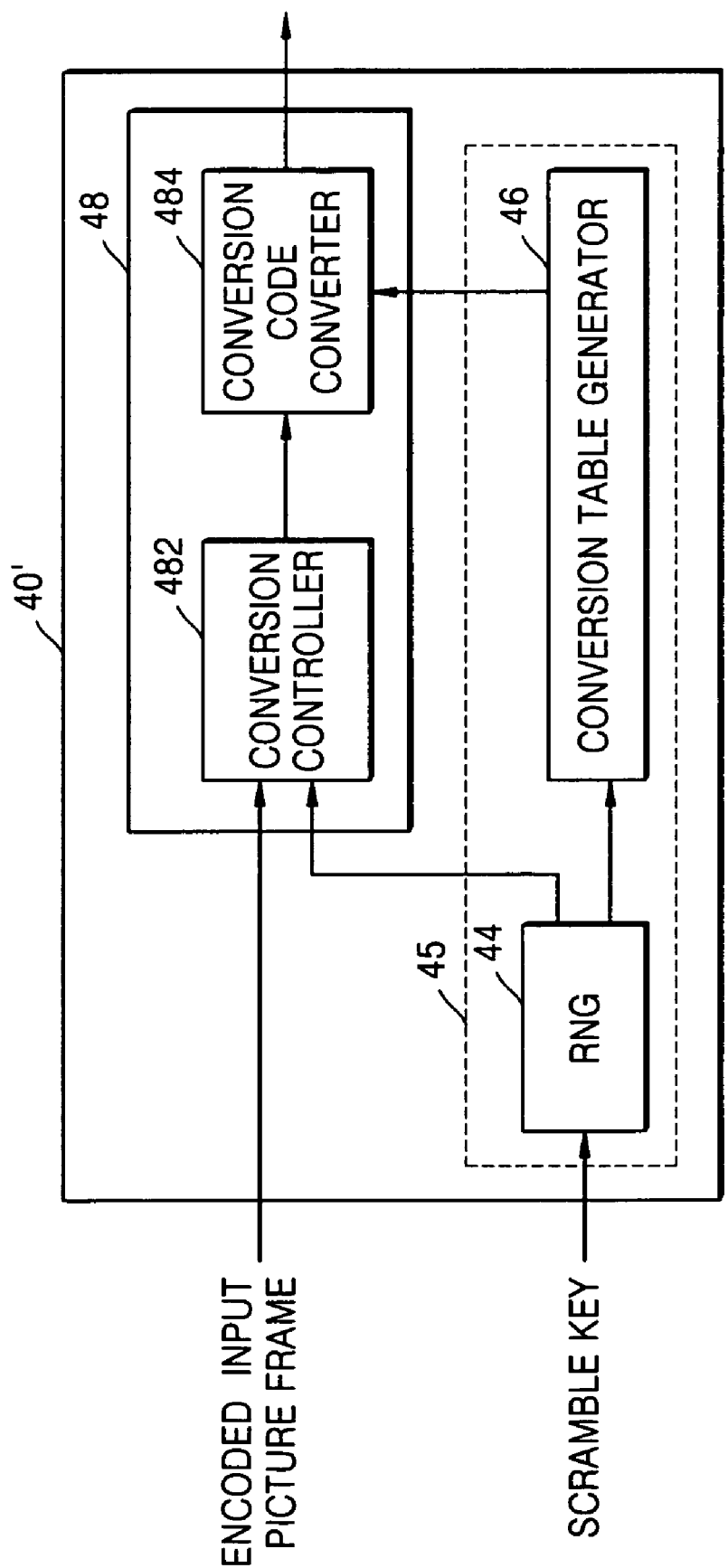
FIG. 5 is a modified block diagram of the scrambling apparatus of FIG. 4.

FIG. 5 is a block diagram of a scrambling apparatus 40' in which the encoder 42 of FIG. 4 is omitted. Referring to FIG. 5, the scrambling apparatus 40' includes a converter 48 and a conversion table generating unit 45. The conversion table generating unit 45 includes an RNG 44 and a conversion table generator 46, which basically perform the same operation as the RNG 103 and the MV code conversion table generator 105 included in the scrambling apparatus 10 of FIG. 1, respectively.

The RNG 44 generates a random number using an input scramble key and outputs the random number to the conversion table generator 46, and the conversion table generator 46 generates a conversion table in the same way as the operation of the MV code conversion table generator 105 of FIG. 1. Also, the RNG 44 generates as a random number a conversion select control signal, which controls on the basis of the conversion table generated by the conversion table generator 46 whether a relevant MV is converted for every macroblock of an encoded input picture, and outputs the conversion select control signal to the converter 48.

The converter 48 includes a conversion controller 482 and a coding code converter 484. The conversion controller 482 controls the coding code converter 484 so that the coding code converter 484 determines whether an MV code of an encoded input picture is converted using the conversion table according to the conversion select control signal input from the RNG 44. The coding code converter 484 converts using the conversion table or does not convert an MV code of a relevant macroblock according to control of the conversion controller 482. Therefore, since randomness is strengthened rather than when MVs of all macroblocks are encoded en bloc on the basis of only the conversion table, a scrambling effect is higher.

With reference to bit lengths of MV codes when the conversion table generator 46 generates the conversion table, if a bit length after conversion is a predetermined bits or more longer than that before the conversion, the conversion in not performed. That is, since the bit length is allocated on the basis of probability in the variable length coding like the Hoffman coding, if an MV value to which a small number of variable length coding bits have been allocated due to a high occurrence frequency is converted into an MV value to which a larger number of variable length coding bits are allocated, the total size of data is naturally larger by probability. Therefore, conversion capable of allowing the total size of data to be too large is not performed.

Referring to the standard table of FIG. 2, if the number of bits after conversion is larger than the number of bits before the conversion by three bits, the conversion is not performed as shown in FIG. 7. Therefore, if '0011' (corresponding to an MV value '−2&30') is converted into '0000 1011' (corresponding to an MV value '−5&27') as a result of a random number using a scramble key, this conversion is not performed. Conversion may be performed between coding codes only with the same number of bits, and not between coding codes with a different number of bits. Also, according to attribute of an MV, since probability of an MV value of 0 is highest, conversion of a coding code '1' corresponding to the MV value of 0 is not performed.

The conversion table generator 46 unconditionally generates a conversion table on the basis of a random number generated by the RNG 44 instead of generating the conversion table according to the above condition. The conversion controller 482 can control the coding code converter 484 to select the random conversion or the conditional conversion for MVs of each macroblock. That is, the conversion controller 482 controls the coding code converter 484 so that a coding code of an MV for every macroblock satisfies the above condition not so that information itself of a conversion table satisfies the above condition.

In detail, the conversion table generator 46 prepares conversion of coding code of an MV allocated to each macroblock of an encoded input picture by generating a certain conversion table on the basis of a random number generated by the RNG 44, and if an MV of a certain macroblock is input to the converter 48, the conversion controller 482 controls the coding code converter 484 so that the coding code converter 484 either converts the coding code of the encoded MV using the conversion table or does not convert it at all. Here, if the conversion select control signal is to use the conversion table, the conversion controller 482 determines whether the coding code of the MV to be converted satisfies a predetermined condition described above, and if the condition is satisfied, the conversion controller 482 controls the coding code converter 484 so that the coding code converter 484 converts the coding code of the encoded MV using the conversion table, and if the condition is not satisfied, the conversion controller 482 controls the coding code converter 484 so that the coding code converter 484 does not convert the coding code of the encoded MV.

As described above, since the coding code converter 484 randomly converts the coding code of the encoded MV according to a control signal input from the conversion controller 482 for every relevant macroblock and the conditional conversion is simultaneously applied to the coding code converter 484, when fast moving video or randomness of scrambling is considered, the conversion controller 482 may control the random conversion and the conditional conversion at the same time.

Figure 6:
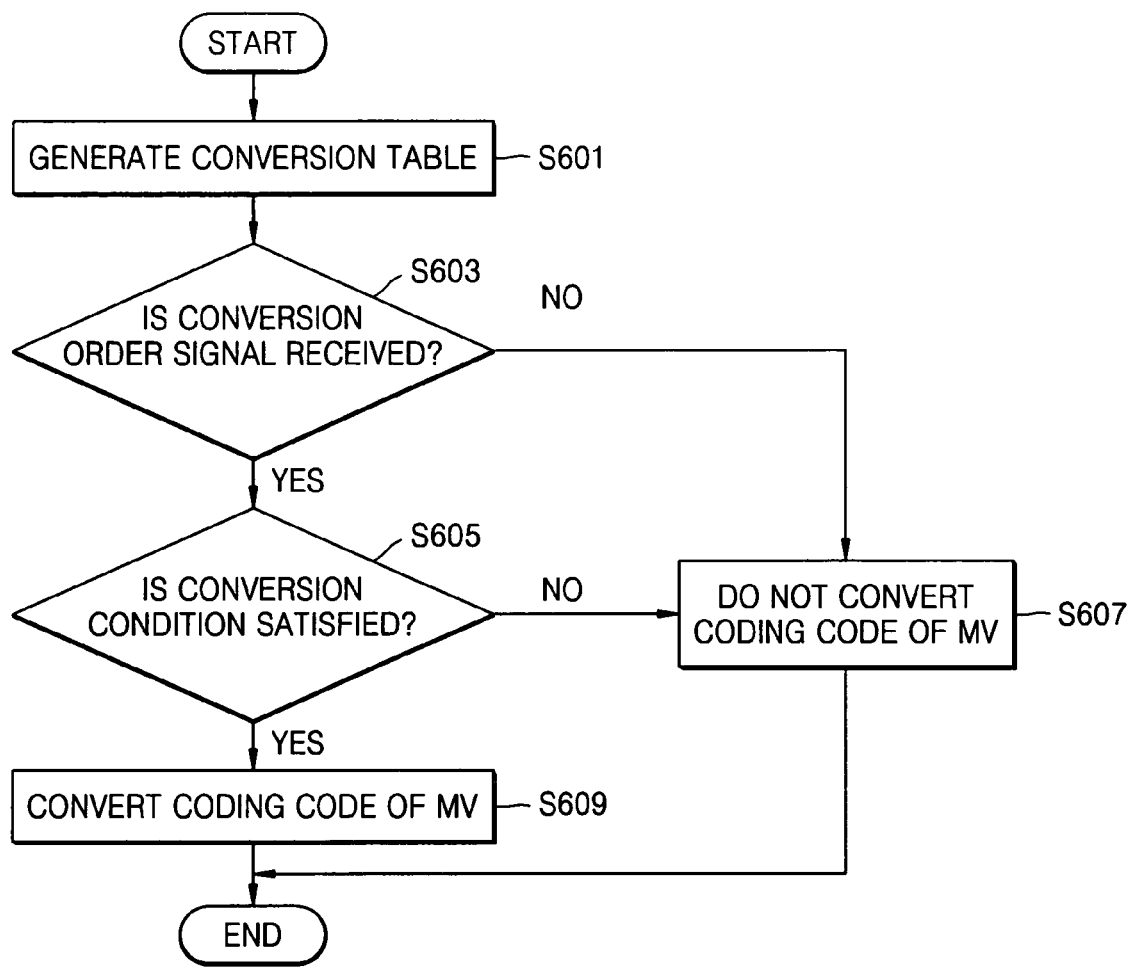
FIG. 6 is a flowchart of a scrambling method according to another exemplary embodiment of the present invention.

FIG. 6 is a flowchart of a scrambling method according to the exemplary embodiment of FIGS. 4 and 5. Referring to FIG. 6, when an MV encoded by the encoder 42 is input to the converter 48, the conversion table generator 46 generates a conversion table in which an MV code corresponding to the MV value is converted into an MV code corresponding to another MV value on the basis of a random number generated by the RNG 44 using an input scramble key in operation S601. The conversion controller 482 determines whether a conversion select control signal input from the RNG 44 is a conversion order signal in operation S603. If it is determined that the conversion select control signal input from the RNG 44 is a conversion order signal in operation S603, the conversion controller 482 determines whether the coding code length of the conversion table to be used for the encoded MV satisfies a conversion condition in operation S605. If the condition is satisfied in operation S605, the coding code converter 484 encodes the coding code of the encoded MV using the conversion table in operation S609. If it is determined that the conversion select control signal input from the RNG 44 is not a conversion order signal in operation 603 or the coding code length of the conversion table to be used for the encoded MV does not satisfy the conversion condition in operation 605, the coding code converter 484 does not convert the coding code of the encoded MV in operation S607.

While the present invention has been particularly shown and described with reference to exemplary embodiments thereof, the spirit and scope of the present invention can also be embodied as computer readable codes on a computer readable recording medium having recorded thereon a computer readable program for performing a scrambling method according to the present invention.

As described above, according to the present invention, randomness of scrambling is strengthened comparing to a method of collectively converting MV codes by converting selectively and randomly MV codes of video data into other MV codes when scrambling.

Also, randomness and efficiency of scrambling are strengthened without damaging compression efficiency of total video data, more particularly in an image compression method according to variable length coding, by performing conditional conversion only if a predetermined condition is satisfied along with selective and random conversion of MV codes.

While this invention has been assumed that input video data was variable length coded with reference to exemplary embodiments thereof, it will be understood by those skilled in the art that fixed length coding of the input video data may be embodied from the spirit and scope of the invention. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A scrambling apparatus comprising:
a processor;
a conversion motion vector code table generator which generates a conversion motion vector code table comprising motion vector codes obtained by converting motion vector codes corresponding to motion vector values of input video data in a standard motion vector code table; and
a conversion controller, executed by the processor, which randomly determines whether a motion vector value is encoded using the conversion motion vector code table or the standard motion vector code table,
wherein the conversion motion vector code table generator generates the conversion motion vector code table based on a random number,
wherein the conversion motion vector table comprises at least one unconverted motion vector code which does not satisfy a predetermined condition after the conversion of a motion vector code corresponding to the at least one unconverted motion vector code.

2. The apparatus of claim 1, wherein, if encoding using the conversion motion vector code table is determined, the conversion controller determines that the motion vector value is encoded using the conversion motion vector code table if motion vector codes before and after conversion of the motion vector value satisfy a predetermined condition.

3. The apparatus of claim 1, wherein the predetermined condition is not satisfied when a number of bits of the motion vector code after the conversion is at least a predetermined number of bits larger than a number of bits of the motion vector code before the conversion.

4. The apparatus of claim 2, wherein the conversion controller determines that the motion vector value is encoded using the standard motion vector code table if a number of bits of the motion vector code after the conversion is at least a predetermined number of bits larger than a number of bits of the motion vector code before the conversion.

5. A scrambling method comprising:
(a) generating a conversion motion vector code table comprising motion vector codes obtained by converting motion vector codes corresponding to motion vector values of input video data in a standard motion vector code table; and
(b) randomly determining whether a motion vector value is encoded using the conversion motion vector code table or the standard motion vector code table,
wherein generating the conversion motion vector code table comprises generating the conversion motion vector code table based on a random number, and
wherein the conversion motion vector table comprises at least one unconverted motion vector code which does not satisfy a predetermined condition after the conversion of a motion vector code corresponding to the at least one unconverted motion vector code.

6. The method of claim 5, further comprising:
(c) if encoding using the conversion motion vector code table is determined in operation (b), determining that the motion vector value is encoded using the conversion motion vector code table if motion vector codes before and after conversion of the motion vector value satisfy a predetermined condition.

7. The method of claim 5, wherein the predetermined condition is not satisfied when a number of bits of the motion vector code after the conversion is at least a predetermined number of bits larger than a number of bits of the motion vector code before the conversion.

8. The method of claim 6, wherein operation (c) comprises:
determining that the motion vector value is encoded using the standard motion vector code table if a number of bits of the motion vector code after the conversion is at least a predetermined number of bits larger than a number of bits of the motion vector code before the conversion.

9. A computer readable medium having recorded thereon a computer readable program for performing a scrambling method comprising:
(a) generating a conversion motion vector code table comprising motion vector codes obtained by converting motion vector codes corresponding to motion vector values of input video data in a standard motion vector code table; and
(b) randomly determining whether a motion vector value is encoded using the conversion motion vector code table or the standard motion vector code table,
wherein generating the conversion motion vector code table comprises generating the conversion motion vector code table based on a random number,
wherein the conversion motion vector table comprises at least one unconverted motion vector code which does not satisfy a predetermined condition after the conversion of a motion vector code corresponding to the at least one unconverted motion vector code.

10. A scrambling apparatus comprising:
a conversion table generating unit which generates a conversion table comprising motion vector codes obtained by converting motion vector codes corresponding to motion vector values of input video data in a standard motion vector code table; and
a converter which selectively performs conversion by randomly determining whether a motion vector code of video data encoded using the standard motion vector code table is converted into another motion vector code with reference to the conversion table,
wherein the conversion table generating unit generates the conversion motion vector code table based on a random number,
wherein the conversion table comprises at least one unconverted motion vector code which does not satisfy a predetermined condition after the conversion of a motion vector code corresponding to the at least one unconverted motion vector code.

11. The apparatus of claim 10, wherein, if the conversion referring to the conversion table is determined, the converter performs the conversion of the motion vector code if a motion vector code after the conversion of the motion vector code satisfies a predetermined condition.

12. The apparatus of claim 10, wherein the predetermined condition is not satisfied when a number of bits of the motion vector code after the conversion is at least a predetermined number of bits larger than a number of bits of the motion vector code before the conversion.

13. The apparatus of claim 11, wherein the converter does not perform the conversion of the motion vector code if a number of bits of the motion vector code after the conversion of the motion vector code is at least a predetermined number of bits larger than a number of bits of the motion vector code before the conversion.

14. The apparatus of claim 11, wherein the converter performs the conversion of the motion vector code if a number of bits of the motion vector code after the conversion of the motion vector code is the same as a number of bits of the motion vector code before the conversion.

15. A scrambling method comprising:
(a) generating a conversion table comprising motion vector codes obtained by converting motion vector codes corresponding to motion vector values of input video data in a standard motion vector code table; and
(b) selectively performing conversion by randomly determining whether a motion vector code of video data encoded using the standard motion vector code table is converted into another motion vector code with reference to the conversion table,
wherein generating the conversion table comprises generating the conversion table based on a random number, and
wherein the conversion table comprises at least one unconverted motion vector code which does not satisfy a predetermined condition after the conversion of a motion vector code corresponding to the at least one unconverted motion vector code.

16. The method of claim 15, further comprising:
(c) if the conversion referring to the conversion table is determined in operation (b), performing the conversion of the motion vector code only if a motion vector code after the conversion of the motion vector code satisfies a predetermined condition.

17. The method of claim 15, wherein the predetermined condition is satisfied when a number of bits of the motion vector code after the conversion is the same as a number of bits of the motion vector code before the conversion.

18. The method of claim 16, wherein operation (c) comprises:
not performing the conversion of the motion vector code if a number of bits of the motion vector code after the conversion of the motion vector code is at least a predetermined number of bits larger than a number of bits of the motion vector code before the conversion.

19. The method of claim 16, wherein operation (c) comprises:
performing the conversion of the motion vector code if a number of bits of the motion vector code after the conversion of the motion vector code is the same as a number of bits of the motion vector before the conversion.

20. A computer readable medium having recorded thereon a computer readable program for performing a scrambling method comprising:
(a) generating a conversion table comprising motion vector codes obtained by converting motion vector codes corresponding to motion vector values of input video data in a standard motion vector code table; and
(b) selectively performing conversion by randomly determining whether a motion vector code of video data encoded using the standard motion vector code table is converted into another motion vector code with reference to the conversion table,
wherein generating the conversion table comprises generating the conversion table based on a random number, and
wherein the conversion table comprises at least one unconverted motion vector code which does not satisfy a predetermined condition after the conversion of a motion vector code corresponding to the at least one unconverted motion vector code.

* * * * *